*(12)* United States Patent
Duncan

(10) Patent No.: US 6,216,308 B1
(45) Date of Patent: Apr. 17, 2001

(54) FULL COVERAGE WINDSHIELD WIPER

(76) Inventor: David Duncan, 3426 Dovie Dr., Spring, TX (US) 77380

( * ) Notice: Subject to any disclaimer, the term of this patent is extended or adjusted under 35 U.S.C. 154(b) by 0 days.

(21) Appl. No.: 09/301,786

(22) Filed: Apr. 29, 1999

(51) Int. Cl.[7] ................................. B60S 1/20; B60S 1/44
(52) U.S. Cl. ..................................... 15/250.24; 15/250.29
(58) Field of Search ........................... 15/250.24, 250.29, 15/250.3, 250.25

(56) References Cited

U.S. PATENT DOCUMENTS

| 2,648,087 | * | 8/1953 | Kiker | 15/250.24 |
| 3,086,239 | * | 4/1963 | Peras | 15/250.29 |
| 3,354,494 | * | 11/1967 | Rischmon | 15/250.24 |
| 4,945,601 | * | 8/1990 | Bilodeau | 15/250.24 |

FOREIGN PATENT DOCUMENTS

| 2030566 | * | 12/1971 | (DE) | 15/250.29 |
| 3600198 | * | 7/1987 | (DE) | 15/250.24 |
| 353052 | * | 7/1931 | (GB) | 15/250.24 |
| 431883 | * | 7/1935 | (GB) | 15/250.24 |

* cited by examiner

*Primary Examiner*—Gary K. Graham

(57) ABSTRACT

A vehicular windshield wiper is provided including a pair of ends slidably situated with respect to a windshield of a vehicle. The wiper is adapted for sliding between a top end and a bottom end of the windshield and further constantly remaining in a horizontal orientation. Optionally, the wiper may remain in a vertical orientation slide moving between sides of the windshield. Further provided is motor and pulley system for moving the windshield wiper between the top end and the bottom end of the windshield.

12 Claims, 2 Drawing Sheets

FULL COVERAGE WINDSHIELD WIPER

BACKGROUND OF THE INVENTION

1. Field of the Invention

The present invention relates to windshield wipers and more particularly pertains to a new full coverage windshield wiper for completely cleaning a windshield of a vehicle.

2. Description of the Prior Art

The use of windshield wipers is known in the prior art. More specifically, windshield wipers heretofore devised and utilized are known to consist basically of familiar, expected and obvious structural configurations, notwithstanding the myriad of designs encompassed by the crowded prior art which have been developed for the fulfillment of countless objectives and requirements.

Known prior art windshield wipers include U.S. Pat. Nos. 4,274,175; 5,093,953; U.S. Pat. No. Des. 307,408; U.S. Pat. Nos. 5,291,109; 5,327,613; and 5,009,459.

In these respects, the full coverage windshield wiper according to the present invention substantially departs from the conventional concepts and designs of the prior art, and in so doing provides an apparatus primarily developed for the purpose of completely cleaning a windshield of a vehicle.

SUMMARY OF THE INVENTION

In view of the foregoing disadvantages inherent in the known types of windshield wipers now present in the prior art, the present invention provides a new full coverage windshield wiper construction wherein the same can be utilized for completely cleaning a windshield of a vehicle.

The general purpose of the present invention, which will be described subsequently in greater detail, is to provide a new full coverage windshield wiper apparatus and method which has many of the advantages of the windshield wipers mentioned heretofore and many novel features that result in a new full coverage windshield wiper which is not anticipated, rendered obvious, suggested, or even implied by any of the prior art windshield wipers, either alone or in any combination thereof.

To attain this, the present invention generally comprises a vehicle having a front or rear windshield frame. As shown in FIG. 1, the frame includes an inner peripheral edge with a pair of generally vertical side edges. Each vertical side edge has both a forwardly extending peripheral lip and a rearwardly extending peripheral lip. These lips reside in coplanar relationship with respect to each other and further perpendicular with the inner peripheral edge, as shown in FIGS. 3 & 4. The forwardly extending lips each have a front inwardly extending flange integrally coupled thereto. The rearwardly extending peripheral lips each have a rear inwardly extending flange integrally coupled thereto. As such, the rear inwardly extending flange is adapted for defining a slot with the corresponding front inwardly extending flange. FIGS. 2–3 show a pair of elongated elastomeric bushings with a generally U-shaped cross-section along an entire length thereof. The elastomeric bushings are each situated within one of the slots of the vehicle windshield frame. In operation, the bushing work to maintain a transparent windshield within the frame of the vehicle. Next provided is a full horizontally oriented, linear windshield wiper formed from a flexible elastomeric material. The windshield wiper has a length equal to a width of the windshield. A pair of ends of the wiper are each equipped with a rigid slider block mounted thereon. As shown in FIG. 4, each slider block is slidably situated within one of the slots between the front inwardly extending flange and the windshield. An actuation assembly is provided including a pair of pulley units. The pulley units each include a top pulley rotatably mounted within one of the slots adjacent a top end thereof. For ensuring coincident rotation of the top pulleys, an elongated post is fixed in coaxial relationship therebetween. Each pulley unit further has a lower pulley rotatably mounted adjacent to a lower end of the corresponding slot. The lower pulleys are maintained in communication with the associated top pulley via a band. For reasons that will soon become apparent, each band is coupled to an associated one of the slider blocks of the windshield wiper. Note FIG. 2. Coupled to one of the bottom pulleys is a motor for raising and lowering the windshield wiper.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new full coverage windshield wiper apparatus and method which has many of the advantages of the windshield wipers mentioned heretofore and many novel features that result in a new full coverage windshield wiper which is not anticipated, rendered obvious, suggested, or even implied by any of the prior art windshield wipers, either alone or in any combination thereof.

It is another object of the present invention to provide a new full coverage windshield wiper which may be easily and efficiently manufactured and marketed.

It is a further object of the present invention to provide a new full coverage windshield wiper which is of a durable and reliable construction.

An even further object of the present invention is to provide a new full coverage windshield wiper which is susceptible of a low cost of manufacture with regard to both materials and labor, and which accordingly is then susceptible of low prices of sale to the consuming public, thereby making such full coverage windshield wiper economically available to the buying public.

Still yet another object of the present invention is to provide a new full coverage windshield wiper which provides in the apparatuses and methods of the prior art some of the advantages thereof, while simultaneously overcoming some of the disadvantages normally associated therewith.

Still another object of the present invention is to provide a new full coverage windshield wiper for completely cleaning a windshield of a vehicle.

Even still another object of the present invention is to provide a new full coverage windshield wiper having a pair of ends slidably situated with respect to a windshield of a vehicle. The wiper is adapted for sliding between a top end and a bottom end of the windshield and further constantly remaining in a full coverage orientation. Further provided is motor and pulley system for moving the windshield wiper between the top end and the bottom end of the windshield.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
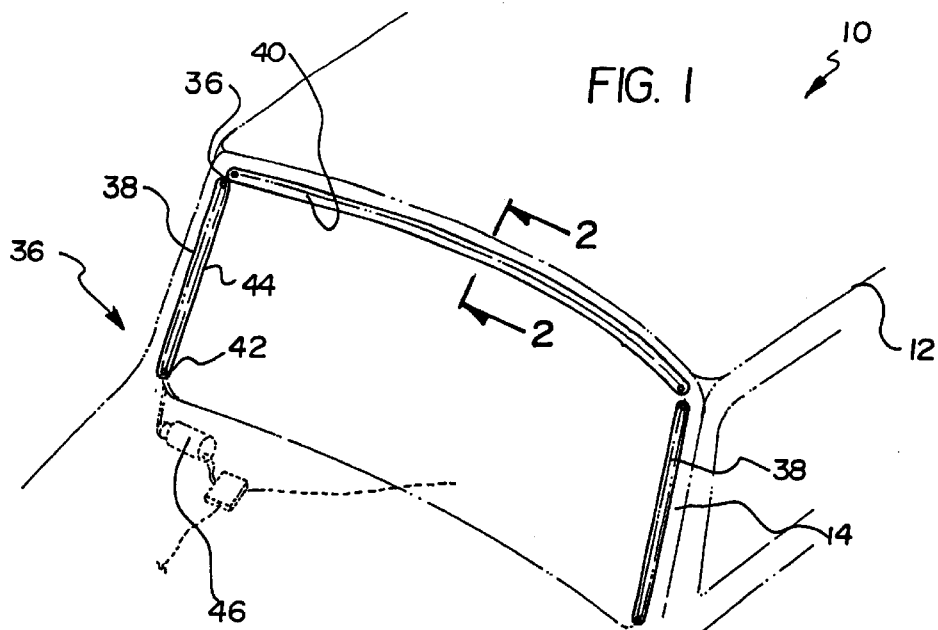
FIG. 1 is a front perspective view of a new full coverage windshield wiper according to the present invention.

With reference now to the drawings, and in particular to FIGS. 1 through 4 thereof, a new full coverage windshield wiper embodying the principles and concepts of the present invention and generally designated by the reference numeral 10 will be described.

Figure 3:
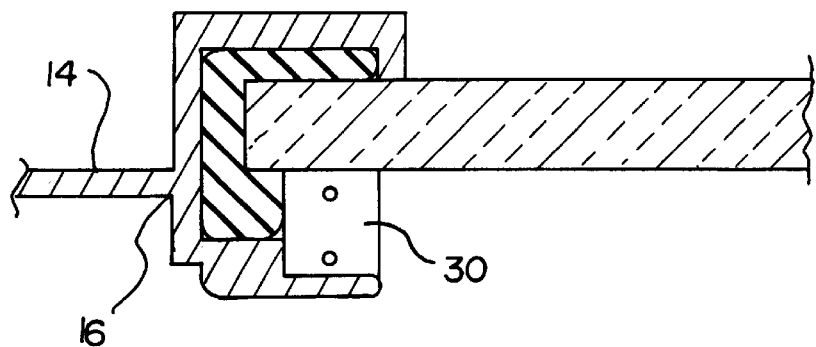
FIG. 3 is a top cross-sectional view of the present invention taken along line 3—3 shown in FIG. 2.
Figure 4:
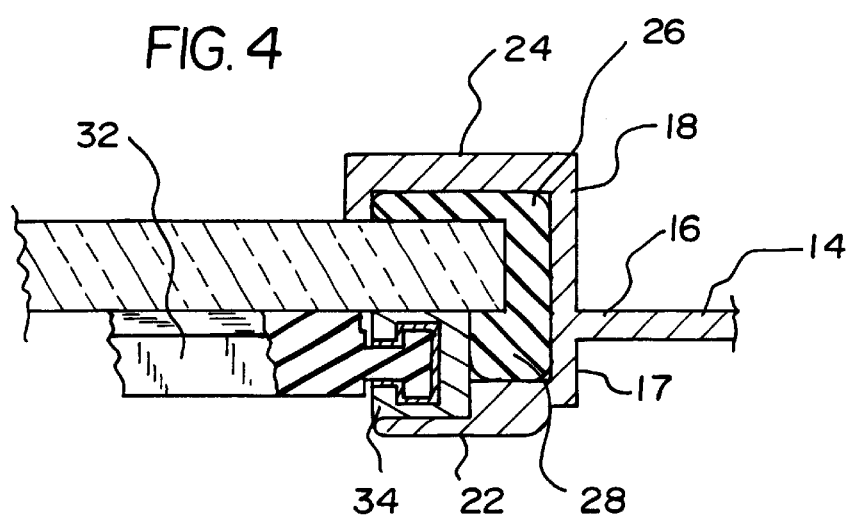
FIG. 4 is another top cross-sectional view of the present invention showing one of the slider blocks of the windshield wiper.

The present invention, designated as numeral 10, includes a vehicle 12 having a front windshield frame 14. (Optionally, the invention may be practiced on the rear windshield frame of the vehicle.) As best shown in FIGS. 3 and 4, the frame includes an inner peripheral edge 16 with a pair of generally vertical side edges. Each vertical side edge has both a forwardly extending peripheral lip 17 and a rearwardly extending peripheral lip 18. These lips reside in coplanar relationship with respect to each other and further perpendicular with the inner peripheral edge, as shown in FIGS. 3 and 4.

The forwardly extending lips each have a front inwardly extending flange 22 perpendicularly coupled thereto. The rearwardly extending peripheral lips each have a rear inwardly extending flange 24 perpendicularly coupled thereto. As such, the rear inwardly extending flange is adapted for defining a slot with the corresponding front inwardly extending flange.

Figure 2:
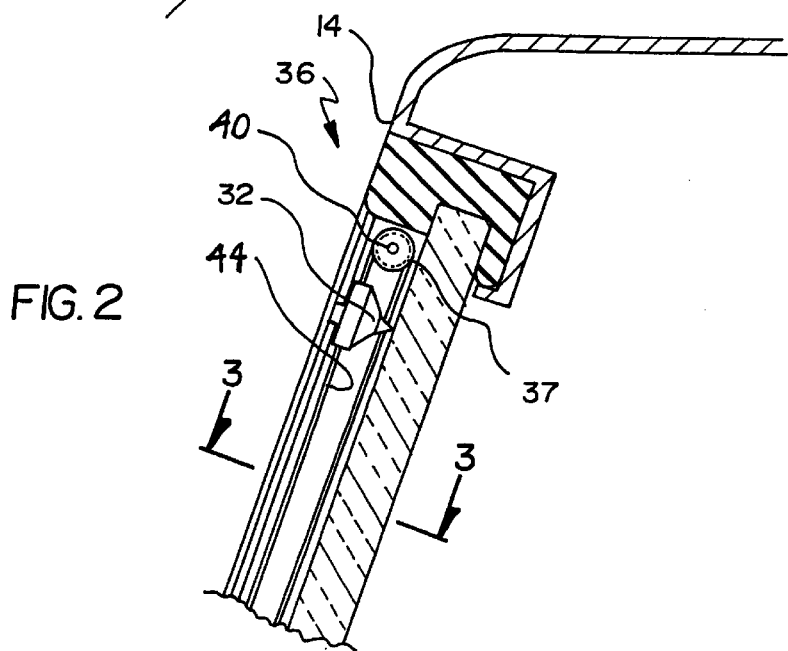
FIG. 2 is a side cross-sectional view of the present invention taken along line 2—2 shown in FIG. 1.

FIGS. 2 through 4 show a pair of elongated elastomeric bushings 26 with a generally U-shaped cross-section along an entire length thereof. The elastomeric bushings are each situated within one of the slots of the vehicle windshield frame. In operation, the bushing work to maintain a transparent windshield within the frame of the vehicle. To further secure the windshield in place, upper and lower bushing are also provided. As shown in FIG. 3, the windshield has a thickness which is less than ½ that of the slots. Further, a front face 28 of the bushing has a length ½ that of a rear face thereof. As such, an auxiliary slot 30 is formed in front of the windshield. Such auxiliary slot is augmented by a thin outboard portion of the front inwardly extending flange. Note FIG. 3.

Next provided is a horizontally oriented, linear windshield wiper 32 formed from a flexible elastomeric material. One edge of the windshield wiper has a triangular cross-section along a length thereof. The windshield wiper has a length equal to a width of the windshield. A pair of ends of the wiper are each equipped with a rigid slider block 34 mounted thereon. A T-shaped slot and groove combination is preferably employed to effect such coupling. As shown in FIG. 4, each slider block is slidably situated within one of the auxiliary slots 30. Optionally, the linear windshield wiper may be oriented in a vertical orientation adapted for moving in a lateral or transverse direction with respect to the longitudinal direction of the automobile. The vertical orientation is a less preferred embodiment since the time for the wiper to travel across the windshield from side to side is longer than the time for traveling from the top to bottom, and vice versa. The longer travel time for the vertically oriented wiper may raise safety concerns when clearly the windshield as quickly as possible is an issue.

An actuation assembly 36 is provided including a pair of pulley units 38. The pulley units each include a top pulley 37 rotatably mounted within one of the slots adjacent a top end thereof. For ensuring coincident rotation of the top pulleys, an elongated post 40 is fixed in coaxial relationship therebetween. In the alternative, an additional band may be used for this purpose. Each pulley unit further has a lower pulley 42 rotatably mounted adjacent to a lower end of the corresponding slot. The lower pulleys are each maintained in communication with the associated top pulley via a band 44. For reasons that will soon become apparent, a first portion of each band is coupled to an associated one of the slider blocks of the windshield wiper. Note FIG. 2. While not shown, a hole is formed within each slider block for allowing the passage of a second portion of the band.

Coupled to one of the bottom pulleys is a motor 46 for raising and lowering the windshield wiper. In the preferred embodiment, the windshield wiper begins at a position adjacent to a top edge of the windshield. Further, upon actuation, the motor moves the wiper to the bottom edge of the windshield and back to the top edge to complete a cycle. It should be noted that conventional control circuitry may be employed to reverse the motor in such a manner. A control panel may be provided within the vehicle for controlling the cycling of the windshield wiper. The present invention thus functions to completely clear the windshield of the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular windshield wiper assembly comprising, in combination:

a vehicle having a front windshield frame including an inner peripheral edge with a pair of generally vertical side edges each having both a forwardly extending peripheral lip and a rearwardly extending peripheral lip, said lips being coplanar with one another and further being perpendicular with respect to the inner peripheral edge, the forwardly extending lips each having a front inwardly extending flange integrally coupled thereto, the rearwardly extending peripheral lips each having a rear inwardly extending flange integrally coupled thereto for defining a slot with the corresponding front inwardly extending flange;

a pair of elongated elastomeric bushings with a generally U-shaped cross-section along an entire length thereof, the elastomeric bushings each situated within one of the slots of the vehicle windshield frame for maintaining a transparent windshield within the frame of the vehicle;

a horizontally oriented, linear windshield wiper formed from a flexible elastomeric material, the windshield wiper having a length equal to a width of the windshield and a pair of ends each with a rigid slider block mounted thereon and slidably situated within one of the slots between the front inwardly extending flange and the windshield;

an actuation assembly including a pair of pulley units each including a top pulley rotatably mounted within one of the slots adjacent a top end thereof, wherein an elongated post is fixed in coaxial relationship between the top pulleys for ensuring coincident rotation thereof, each pulley unit having a lower pulley rotatably mounted adjacent to a lower end of the corresponding slot and further in communication with the associated top pulley via a band, wherein each band is coupled to an associated one of the slider blocks of the windshield wiper; and a motor coupled to one of the bottom pulleys for raising and lowering the windshield wiper for clearing the windshield of the vehicle.

2. A vehicular windshield wiper assembly comprising:

a vehicle having a front windshield;

a windshield frame forming opposing slots within which the windshield is mounted;

a horizontally oriented windshield wiper including a pair of ends slidably situated with respect to the windshield for sliding between a top end and a bottom end thereof and further constantly remaining in a horizontal orientation, each end of the wiper having a hooking member, each said hooking member comprising an extension portion extending from an end of the wiper, each of the extension portions having a T-shape, a pair of slider blocks, each having a T-shaped groove which receives a respective extension portion of the wiper end and resists removal of the T-shaped wiper end from the T-shaped groove in the slider block, each said slider block is mounted for sliding movement in said respective slots formed by said frame; and actuation means for moving the windshield wiper between the top end and the bottom end of the windshield.

3. A vehicular windshield wiper assembly as set forth in claim 2 wherein the actuation means includes at least one pulley unit.

4. A vehicular windshield wiper assembly as set forth in claim 3 wherein a pair of pulley units are included on each side of the windshield and are adapted to move coincidentally.

5. A vehicular windshield wiper assembly as set forth in claim 2 wherein the windshield wiper has a length equal to a width of the windshield.

6. A vehicular windshield wiper assembly as set forth in claim 2 wherein the windshield wiper is formed from a flexible material.

7. A vehicular windshield wiper assembly comprising:

a vehicle having a windshield;

a windshield frame forming opposing slots within which the windshield is mounted;

a windshield wiper including a pair of ends slidably situated with respect to the windshield for sliding between opposite sides of the windshield, each end of the wiper having a hooking member, each said hooking member comprising an extension portion extending from an end of the wiper, each of the extension portions having a T-shape, a pair of slider blocks, each having a T-shaped groove which receives a respective extension portion of the wiper end and resists removal of the T-shaped wiper end from the T-shaped groove in the slider block, each said slider block is mounted for sliding movement in said respective slots formed by said frame; and actuation means for moving the windshield wiper between the opposite sides of the windshield.

8. A vehicular windshield wiper assembly as set forth in claim 7 wherein the actuation means includes at least one pulley unit.

9. A vehicular windshield wiper assembly as set forth in claim 8 wherein a pair of pulley units are included on a top and a bottom of the windshield and are adapted to move coincidentally.

10. A vehicular windshield wiper assembly as set forth in claim 7 wherein the windshield wiper has a length equal to a parallel length of the windshield.

11. A vehicular windshield wiper assembly as set forth in claim 7 wherein the windshield wiper is formed from a flexible material.

12. A vehicular windshield wiper assembly comprising, in combination:

a vehicle having a windshield frame including an inner peripheral edge with a pair of side edges each having both a forwardly extending peripheral lip and a rearwardly extending peripheral lip, said lips being coplanar with one another and further perpendicular with the inner peripheral edge, the forwardly extending lips each having a front inwardly extending flange integrally coupled thereto, the rearwardly extending peripheral lips each having a rear inwardly extending flange integrally coupled thereto for defining a slot with the corresponding front inwardly extending flange;

a pair of elongated elastomeric bushings, the elastomeric bushings each situated within one of the slots of the vehicle windshield frame for maintaining a transparent windshield within the frame of the vehicle;

a linear windshield wiper formed from a flexible elastomeric material, a pair of ends each with a rigid slider block mounted thereon and slidably situated within one of the slots between the front inwardly extending flange and the windshield;

an actuation assembly including a pair of pulley units each including a top pulley rotatably mounted within one of the slots adjacent to a top end thereof, wherein a post is fixed in coaxial relationship between the top pulleys for ensuring coincident rotation thereof, each pulley unit having a lower pulley rotatably mounted adjacent to a lower end of the corresponding slot and further in communication with the associated top pulley via a band, wherein each band is coupled to an associated one of the slider blocks of the windshield wiper; and a motor coupled to one of the bottom pulleys for raising and lowering the windshield wiper for clearing the windshield of the vehicle.

* * * * *